United States Patent
Kim et al.

(10) Patent No.: US 10,433,027 B2
(45) Date of Patent: Oct. 1, 2019

(54) METHOD AND APPARATUS FOR SIGNALING VIDEO ENHANCEMENT INFORMATION (VEI) FOR VIDEO QUALITY ENHANCEMENT OF FIXED/MOBILE BROADCASTING HYBRID 3DTV

(71) Applicants: Electronics and Telecommunications Research Institute, Daejeon (KR); Foundation for Research and Business, Seoul National University of Science and Technology, Seoul (KR)

(72) Inventors: Sung Hoon Kim, Daejeon (KR); Hui Yong Kim, Daejeon (KR); Jin Soo Choi, Daejeon (KR); Dong Ho Kim, Seoul (KR); Dong Ho You, Yangju-si (KR); Jung Yup Jang, Seoul (KR)

(73) Assignees: Electronics and Telecommunications Research Institute, Daejeon (KR); Foundation for Research and Business, Seoul National University of Science and Technology, Seoul (KR)

( * ) Notice: Subject to any disclaimer, the term of this patent is extended or adjusted under 35 U.S.C. 154(b) by 0 days.

(21) Appl. No.: 15/433,179

(22) Filed: Feb. 15, 2017

(65) Prior Publication Data

US 2018/0234741 A1  Aug. 16, 2018

(30) Foreign Application Priority Data

Feb. 15, 2017  (KR) .................. 10-2017-0020361

(51) Int. Cl.
*H04N 21/81* (2011.01)
*H04L 29/06* (2006.01)
(Continued)

(52) U.S. Cl.
CPC .......... *H04N 21/816* (2013.01); *H04L 69/08* (2013.01); *H04N 21/2362* (2013.01); *H04N 21/4345* (2013.01); *H04N 21/6125* (2013.01)

(58) Field of Classification Search
CPC ... H04N 21/816; H04N 19/436; H04N 19/463
See application file for complete search history.

(56) References Cited

U.S. PATENT DOCUMENTS 9,271,017 B2    2/2016  Jung et al.
2010/0157025 A1*  6/2010  Suh .................... H04N 13/0059
                                             348/51

(Continued)

FOREIGN PATENT DOCUMENTS

WO    WO 2012/064123 A2    5/2012

OTHER PUBLICATIONS

Jang Jung-yeop et al. "System Configuration and Signaling for UHD/HD Hybrid 3DTV Broadcasting." 28th Workshop on Image Processing and Image Understanding (2016).

*Primary Examiner* — Sumaiya A Chowdhury
(74) *Attorney, Agent, or Firm* — NSIP Law

(57) ABSTRACT

Disclosed is a method and apparatus for IP-based hybrid 3DTV content transmission and reception. According to one aspect of the present disclosure, an IP-based hybrid 3DTV content reception apparatus includes: a receiving unit receiving multiplexed 3DTV content information; an additional data obtaining unit obtaining service layer signaling information from the received 3DTV content information, and obtaining additional data based on the obtained service layer signaling information; a decoding unit decoding the received 3DTV content information by using the obtained additional data; and a playing back unit playing back the decoded 3DTV content.

20 Claims, 12 Drawing Sheets

(51) Int. Cl.
*H04N 21/61* (2011.01)
*H04N 21/434* (2011.01)
*H04N 21/2362* (2011.01)

(56) References Cited

U.S. PATENT DOCUMENTS

| | | | | |
|---|---|---|---|---|
| 2012/0331508 | A1* | 12/2012 | Vare | H04L 65/4076 |
| | | | | 725/50 |
| 2013/0147914 | A1* | 6/2013 | Park | H04N 21/23614 |
| | | | | 348/43 |
| 2013/0276046 | A1 | 10/2013 | Park et al. | |
| 2013/0286868 | A1* | 10/2013 | Oyman | H04W 24/06 |
| | | | | 370/252 |
| 2016/0234355 | A1* | 8/2016 | Lee | H04L 65/80 |

* cited by examiner

METHOD AND APPARATUS FOR SIGNALING VIDEO ENHANCEMENT INFORMATION (VEI) FOR VIDEO QUALITY ENHANCEMENT OF FIXED/MOBILE BROADCASTING HYBRID 3DTV

CROSS REFERENCE TO RELATED APPLICATION

The present application claims priority to Korean Patent Application No. 10-2017-0020361, filed Feb. 15, 2017, the entire contents of which is incorporated herein for all purposes by this reference.

BACKGROUND

Field

The present disclosure relates generally to service layer signaling (SLS) for video quality enhancement of 3DTV.

More particularly, the present disclosure relates to a service layer signaling method and apparatus for video quality enhancement of fixed/mobile broadcasting hybrid 3DTV in a next-generation terrestrial broadcasting system based on ATSC 3.0 ROUTE/DASH.

Description of Related Art

A conventional broadcasting system multiplexes data such as video, audio, and video enhancement information (VEI) for video quality enhancement, based on MPEG-TS (transport stream). In addition, synchronization between streams is performed by using synchronization information such as presentation time stamp (PTS)/decoding time stamp (DTS), etc.

According to a conventional broadcasing system, additional data such as VEI for video quality enhancement of hybrid 3DTV, etc. is multiplexed with video/audio signals by using MPEG-TS transfer protocol, and transmitted. Therefore, transformation of a protocol for compatibility with IP protocol-based broadcasting/communication service is necessary. Solutions therefor are urgently required.

SUMMARY

It is an object of the present disclosure to propose a method and apparatus for transmitting and/or receiving additional data of IP-based hybrid 3DTV content.

In is another object of the present disclosure to propose a method and apparatus for transmitting additional data (VEI) for video quality enhancement of IP-based hybrid 3DTV in a next-generation terrestrial service environment by using signaling of an IP-based next-generation broadcasting standard system.

In is another object of the present disclosure to propose a method and apparatus for transmitting video enhancement information (VEI) for video quality enhancement of additional video of fixed/mobile broadcasting hybrid 3DTV based on ATSC 3.0 ROUTE/DASH.

It is to be understood that technical problems to be solved by the present disclosure are not limited to the aforementioned technical problems and other technical problems which are not mentioned will be apparent from the following description to a person with an ordinary skill in the art to which the present disclosure pertains.

According to one aspect of the present disclosure, there is provided an IP-based hybrid 3DTV content reception apparatus. The apparatus includes: a receiving unit receiving multiplexed 3DTV content information; an additional data obtaining unit obtaining service layer signaling information from the received 3DTV content information, and obtaining additional data based on the obtained service layer signaling information; a decoding unit decoding the received 3DTV content information by using the obtained additional data; and a playing back unit playing back the decoded 3DTV content.

In the IP-based hybrid 3DTV content reception apparatus, the service layer signaling information may provide information about a video or audio component composing the 3DTV content and about the additional data related to the video or audio component for each unit period.

In the IP-based hybrid 3DTV content reception apparatus, the service layer signaling information may provide information about a video or audio component composing the 3DTV content and about a session through which the additional data related to the video or audio component is transmitted.

In the IP-based hybrid 3DTV content reception apparatus, the additional data may be video enhancement information (VEI) for enhancing video quality of a video.

In the IP-based hybrid 3DTV content reception apparatus, the service layer signaling information may provide information about dependency of the VEI.

In the IP-based hybrid 3DTV content reception apparatus, the additional data may be received through a physical layer pipe (PLP) that is same as that of a video or audio component composing the 3DTV content.

In the IP-based hybrid 3DTV content reception apparatus, the additional data may be received through a physical layer pipe that is different from that of a video or audio component composing the 3DTV content.

In the IP-based hybrid 3DTV content reception apparatus, the service layer signaling information may provide information for identifying the physical layer pipe through which the additional data is received.

In the IP-based hybrid 3DTV content reception apparatus, the additional data may be received separately from the 3DTV content and the service layer signaling information may provide information about the obtaining of the additional data.

According to another aspect of the present disclosure, there is provided an IP-based hybrid 3DTV content reception method. The method includes: receiving multiplexed 3DTV content information; obtaining service layer signaling information from the received 3DTV content information, and obtaining additional data based on the obtained service layer signaling information; decoding the 3DTV content information by using the obtained additional data; and playing back the decoded 3DTV content.

According to another aspect of the present disclosure, there is provided an IP-based hybrid 3DTV content transmission apparatus. The apparatus includes: an input unit receiving 3DTV content; an encoding unit encoding the received 3DTV content; an additional data generating unit generating additional data; a service layer signaling information generating unit generating service layer signaling information for obtaining the generated additional data; a multiplexing unit generating 3DTV content information by multiplexing the encoded 3DTV content and the service layer signaling information; and a transmitting unit transmitting the multiplexed 3DTV content information.

In the IP-based hybrid 3DTV content transmission apparatus, the service layer signaling information may provide information about a video or audio component composing the 3DTV content and about the additional data related to the video or audio component for each unit period.

In the IP-based hybrid 3DTV content transmission apparatus, the service layer signaling information may provide information about a video or audio component composing the 3DTV content and about a session through which the additional data related to the video or audio component is transmitted.

In the IP-based hybrid 3DTV content transmission apparatus, the additional data may be video enhancement information (VEI) for enhancing video quality of a video.

In the IP-based hybrid 3DTV content transmission apparatus, the service layer signaling information may provide information about dependency of the VEI.

In the IP-based hybrid 3DTV content transmission apparatus, the additional data may be transmitted through a physical layer pipe (PLP) that is same as that of a video or audio component composing the 3DTV content.

In the IP-based hybrid 3DTV content transmission apparatus, the additional data may be transmitted through a physical layer pipe that is different from that of a video or audio component composing the 3DTV content.

In the IP-based hybrid 3DTV content transmission apparatus, the service layer signaling information may provide information for identifying the physical layer pipe through which the additional data is transmitted.

In the IP-based hybrid 3DTV content transmission apparatus, the additional data may be transmitted separately from the 3DTV content and the service layer signaling information may provide information about the obtaining of the additional data.

According to another aspect of the present disclosure, there is provided an IP-based hybrid 3DTV content transmission method. The method includes: receiving 3DTV content; encoding the received 3DTV content; generating additional data; generating service layer signaling information for obtaining the generated additional data; generating 3DTV content information by multiplexing the encoded 3DTV content and the service layer signaling information; and transmitting the multiplexed 3DTV content information.

It is to be understood that the foregoing summarized features are exemplary aspects of the following detailed description of the present disclosure without limiting the scope of the present invention.

According to the present disclosure, it is possible to efficiently transmit and/or receive additional data of IP-based hybrid 3DTV content.

In addition, according to the present disclosure, it is possible to provide a method and apparatus for transmitting VEI for video quality enhancement of hybrid 3DTV by being compatible with an IP-based next-generation broadcasting system.

In addition, according to the present disclosure, it is possible to provide a method and apparatus for transmitting VEI for video quality enhancement of additional video of the fixed/mobile broadcasting hybrid 3DTV by being compatible with a next-generation broadcasting system standard based on ATSC 3.0 ROUTE/DASH.

In addition, according to the present disclosure, it is possible to provide a method and apparatus for transmitting VEI for video quality enhancement of hybrid 3DTV in an environment using a scalable video 3D method and a simulcast 3D method.

In addition, according to the present disclosure, it is possible to provide a method and apparatus for transmitting VEI for video quality enhancement of hybrid 3DTV in a single PLP service environment and a multiple PLP service environment.

In addition, according to the present disclosure, it is possible to provide a method and apparatus for transmitting VEI for video quality of hybrid 3DTV in an IP broadband broadcasting/communication network associated service environment.

Effects that may be obtained from the present disclosure will not be limited to only the above described effects. In addition, other effects which are not described herein will become apparent to those skilled in the art from the following description.

DETAILED DESCRIPTION

Figure 1:
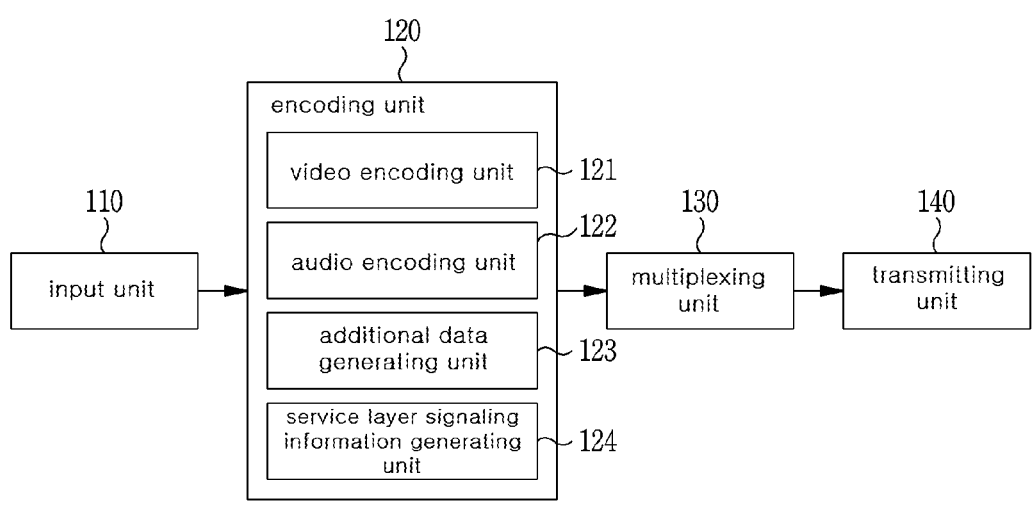
FIG. 1 is a view showing an embodiment of a hybrid 3DTV transmission apparatus according to the present disclosure.

Hereinbelow, exemplary embodiments of the present disclosure will be described in detail with reference to the accompanying drawings such that the invention can be easily embodied by one of ordinary skill in the art to which this invention belongs. However, the embodiments of the present disclosure may be changed to a variety of embodiments and the scope and spirit of the present invention are not limited to the embodiment described hereinbelow.

In the description of embodiments of the present disclosure, the detailed descriptions of known related constitutions or functions thereof may be omitted if they make the gist of the present disclosure unclear. In addition, the parts irrelevant to the description are omitted in the drawings, and similar symbol numbers are assigned for the similar parts.

In the present disclosure, it should be understood that when an element is referred to as being "coupled" or "connected" to, or "combined" with another element, it can be directly coupled or connected to the other element or intervening elements may be present therebetween. In addition, unless the context clearly indicates otherwise, it should be further understood that when an element "comprises" or "includes" another element, additional elements other than a corresponding element are not excluded, but may be included.

In the present disclosure, the terms "first", "second", etc. are only used to distinguish one element from another element, and unless the context clearly indicates otherwise, they do not limit the order or priority, etc. of the elements. Therefore, a first element of an embodiment may be referred as a second element in another embodiment, and a second element of an embodiment may be also referred to as a first element in another embodiment without departing from the technical spirit of the invention.

In the present disclosure, elements are independently shown only in order to describe that they have different characteristics, and thus the elements do not mean that they have to be separated. That is, a plurality of elements may be integrated into one hardware or software unit, or one element may be divided into a plurality of elements thereby being operated as a plurality of hardware or software units. Therefore, the embodiments of such integrated or divided elements are included in the scope of the present disclosure, without specific mention.

In the present disclosure, elements described in the various embodiments may not serve as necessary elements, and some elements may be optional elements. Therefore, the scope of the present disclosure includes an embodiment composed of partial group of elements described in an embodiment. In addition, the scope of the present disclosure includes an embodiment including other elements in addition to elements of the various embodiments.

The following definitions are provided for terms that are used in the present disclosure.

A left video may mean a video provided to the left eye.

A right video may mean a video provided to the right eye.

A standard video (reference video) is a video that is standard (reference) among two videos composing a stereoscopic video in 3DTV service, may mean left or right video with high resolution.

An additional video is a video that is used in addition to the standard video to generate a stereoscopic video in 3DTV service. When, the standard video is a left video, the additional video is a right video with low resolution. When the standard video is a right video, the additional video is a left video with low resolution.

Video enhancement information (VEI) may mean additional data that is added to enhance a video quality of hybrid 3DTV in A/104 Part5 Annex B standard.

The ATSC 3.0 broadcasting system, which is a North American next-generation terrestrial broadcasting method, performs broadcast content transmission and reception, and service signaling based on ROUTE/DASH protocol. In other words, before receiving content, signaling information based on ROUTE/DASH, which is a transmission and reception matching standard, is received first. In addition, it is possible to selectively receive and decode only desired content by analyzing content of the received signaling information.

That is, in the IP-based next-generation broadcasting standard, based on ATSC 3.0 ROUTE/DASH protocol, each piece of data is transmitted through each session and information related thereto is signaled, whereby a receiving end receives and decodes only a session through which desired components are transferred. Therefore, data such as video, audio, and VEI may be received while maintaining compatibility with IP broadband content service based on IP not MPEG-TS.

Hereinafter, embodiments of the present disclosure will be described with reference to the accompanying drawings.

FIG. 1 is a view showing an embodiment of a hybrid 3DTV transmission apparatus according to the present disclosure.

The hybrid 3DTV transmission apparatus may include an input unit 110, an encoding unit 120, a multiplexing unit 130, and/or a transmitting unit 140.

The encoding unit 120 may include a video encoding unit 121, an audio encoding unit 122, an additional data generating unit 123, and/or a service layer signaling information generating unit 124.

The input unit 110 may receive content that is a target of encoding and transmission. The received content may be encoded at the encoding unit 120. A video composing content may be encoded at the video encoding unit 121, and an audio composing content may be encoded at the audio encoding unit 122. The additional data generating unit 123 may generate all additional data that is required to encode and playback content. The generated additional information may be encoded or may not be encoded. Additional data generated at the additional data generating unit 123 may include additional data for video quality enhancement, for example, VEI. Additional data may be generated in a video encoding process of the video encoding unit 121 and/or in an audio encoding process of the audio encoding unit 122. Alternatively, additional data may be generated in a multiplexing process of the multiplexing unit 130 that will be described later, and additional data generated at the multiplexing unit 130 may be multiplexed with information (data) input to the multiplexing unit 130 or may be separately transmitted. The service layer signaling information generating unit 124 may generate service layer signaling information related to a service that a user wants. The service layer signaling information may include information for obtaining additional data generated at the additional data generating unit 123.

In case of 3D content, a video composing content may include a standard video and an additional video. The standard video and the additional video may be respectively encoded at a standard video encoding unit and an additional video encoding unit. The standard video encoding unit and the additional video encoding unit that are not shown may be included in the video encoding unit 121.

The encoded video and audio, the service layer signaling information and/or the additional data may be multiplexed at the multiplexing unit 130, and may be transmitted by the transmitting unit 140.

The multiplexing unit 130 may multiplex the data to be transmitted by using one physical layer pipe (PLP). Alternatively, the multiplexing unit 130 may multiplex data to be transmitted by using a plurality of PLPs. Alternatively, the multiplexing unit 130 may not multiplex parts of data to be transmitted. The data that is not multiplexed may be separately received through external networks, such as internet, etc. For example, the multiplexing unit 130 may not multiplex VEI, and VEI may be transmitted to a hybrid 3DTV reception apparatus through a broadband network.

Figure 2:
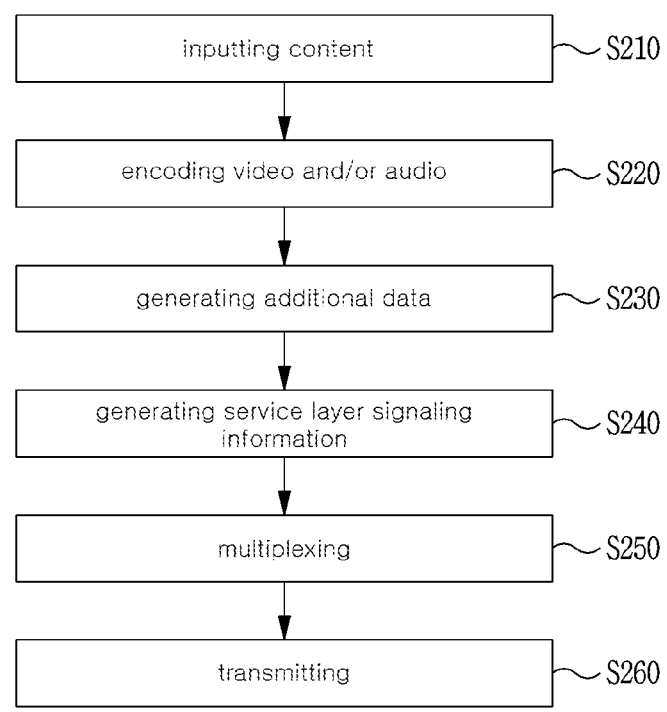
FIG. 2 is a flowchart showing an embodiment of a hybrid 3DTV transmission method according to the present disclosure.

FIG. 2 is a flowchart showing an embodiment of a hybrid 3DTV transmission method according to the present disclosure.

3DTV content that is a target of encoding and transmission may be input at step S210. Next, video and/or audio composing 3DTV content may be encoded at step S220. Additional data for decoding and playing back content may be generated at step S230. Service layer signaling information about service that a user wants to be provided may be generated at step S240. The encoded video and audio, the service layer signaling information and/or the additional data may be multiplexed at step S250, and the multiplexed content information may be transmitted at step S260.

The hybrid 3DTV transmission method of FIG. 2 may be performed by the hybrid 3DTV transmission apparatus of FIG. 1, and the specific embodiment and modification that are described with reference to FIG. 1 may be also applied to FIG. 2. When there is no dependency between the steps of the hybrid 3DTV transmission method of FIG. 2, the performance order of the steps may be changed or the steps may be simultaneously preformed. Alternatively, new step may be inserted to random position.

Figure 3:
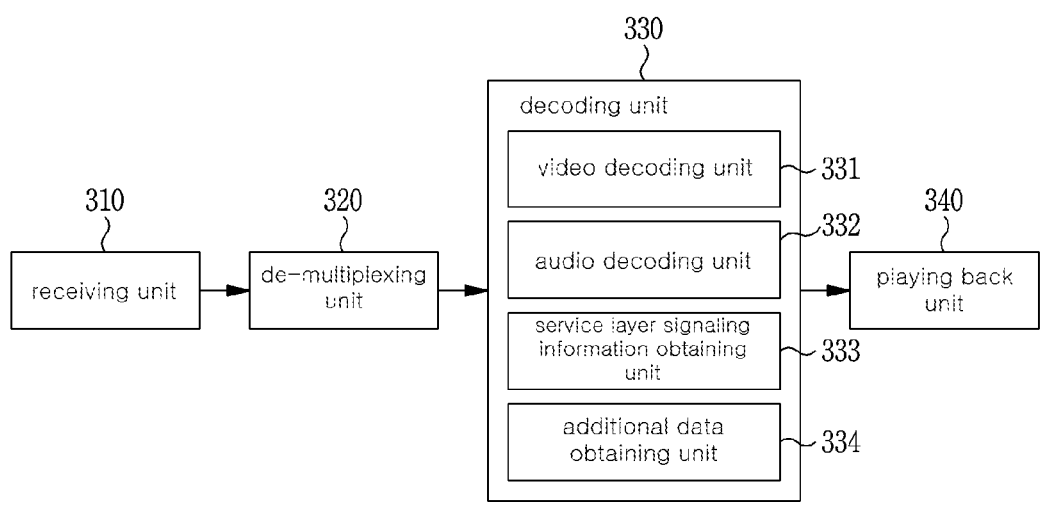
FIG. 3 is a view showing an embodiment of a hybrid 3DTV reception apparatus according to the present disclosure.

FIG. 3 is a view showing an embodiment of a hybrid 3DTV reception apparatus according to the present disclosure.

The hybrid 3DTV reception apparatus may include a receiving unit 310, a de-multiplexing unit 320, a decoding unit 330, and/or a playing back unit 340.

The decoding unit 330 may include a video decoding unit 331, an audio decoding unit 332, a service layer signaling information obtaining unit 333, and/or an additional data obtaining unit 334.

The receiving unit 310 may receive the multiplexed content information transmitted by the hybrid 3DTV transmission apparatus. The de-multiplexing unit 320 may de-multiplex the received content information so as to extract the video, the audio, the service layer signaling information, and/or the additional data. When the received content information does not include additional data, the receiving unit 310 may separately receive the additional data. For example, when the received content information does not include VEI, the VEI may be received through a broadband network.

The video decoding unit 331 may decode video data composing content information. The audio decoding unit 332 may decode audio data composing content information. The service layer signaling information obtaining unit 333 may obtain service layer signaling information about service that a user wants. The additional data obtaining unit 334 may obtain additional data based on the service layer signaling information. The additional data may be received by being included in content information received by the receiving unit 310, or may be received separately from the content information received by the receiving unit 310.

In case of 3D content, a standard video and an additional video may be respectively decoded at a standard video decoding unit and an additional video decoding unit that are not shown. The standard video decoding unit and the additional video decoding unit may be included in the video decoding unit 331.

The playing back unit 340 may playback content by using the decoded video, audio, obtained service layer signaling information, and/or additional data.

As described above, the additional data may include additional information that is required to decode and playback content. Therefore, video decoding, audio decoding at the decoding unit 330 and/or playing back at the playing back unit 240 may be performed based on the additional data.

Figure 4:
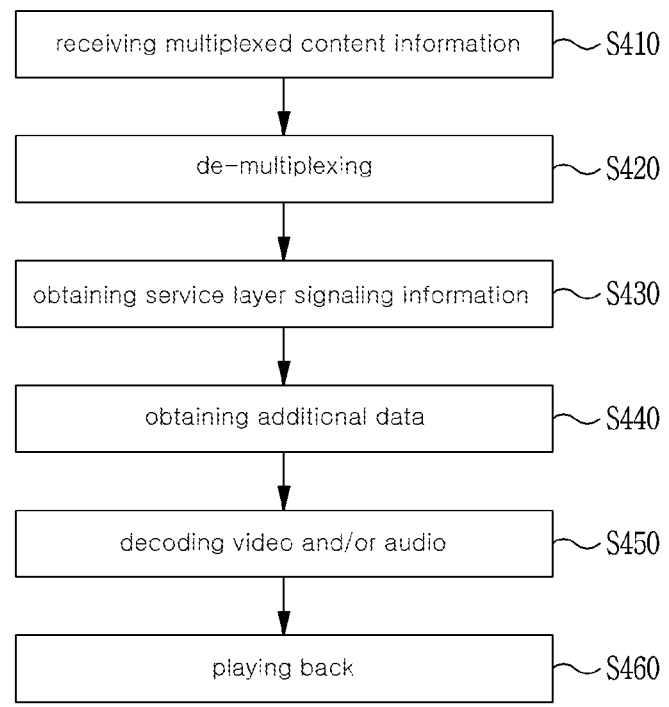
FIG. 4 is a view showing an embodiment of a hybrid 3DTV reception method according to the present disclosure.

FIG. 4 is a view showing an embodiment of a hybrid 3DTV reception method according to the present disclosure.

The multiplexed content information may be received at step S410. The received content information may be de-multiplexed at step S420. Service layer signaling information may be obtained at step S430. Additional data may be obtained based on the obtained service layer signaling information at step S440. Decoding of video and/or audio composing content may be performed at step S450. The decoded content may be played back at step S460. The processes of step S450 and step S460 may be performed based on the obtained service layer signaling information and/or additional data.

The hybrid 3DTV reception method of FIG. 4 may be performed by the hybrid 3DTV reception apparatus of FIG. 3, and the specific embodiment and modification that are described with reference to FIG. 3 may be also applied to FIG. 4. When there is no dependency between the steps of the hybrid 3DTV reception method of FIG. 4, the performance order of the steps may be changed or the steps may be simultaneously preformed. Alternatively, new step may be inserted to random position.

The hybrid 3DTV transmission apparatus (method) and the hybrid 3DTV reception apparatus (method) that are described with reference to FIGS. 1 to 4 may inversely perform processes corresponding to each other. That is, a description of each unit of the apparatuses and a description of each step of the methods may correspond to each other. Description of one apparatus (method) and embodiment and/or modification thereof may be applied to the other apparatus (method).

Hereinafter, various embodiments of signaling additional data, for example, VEI for video quality enhancement of additional video will be described. Service layer signaling information that is described with reference to FIGS. 1 to 4 may correspond to service layer signaling (SLS) that will be described later. In addition, additional data that are described with reference to FIGS. 1 to 4 may correspond to VEI or VEI segment that will be described later.

Figure 5:
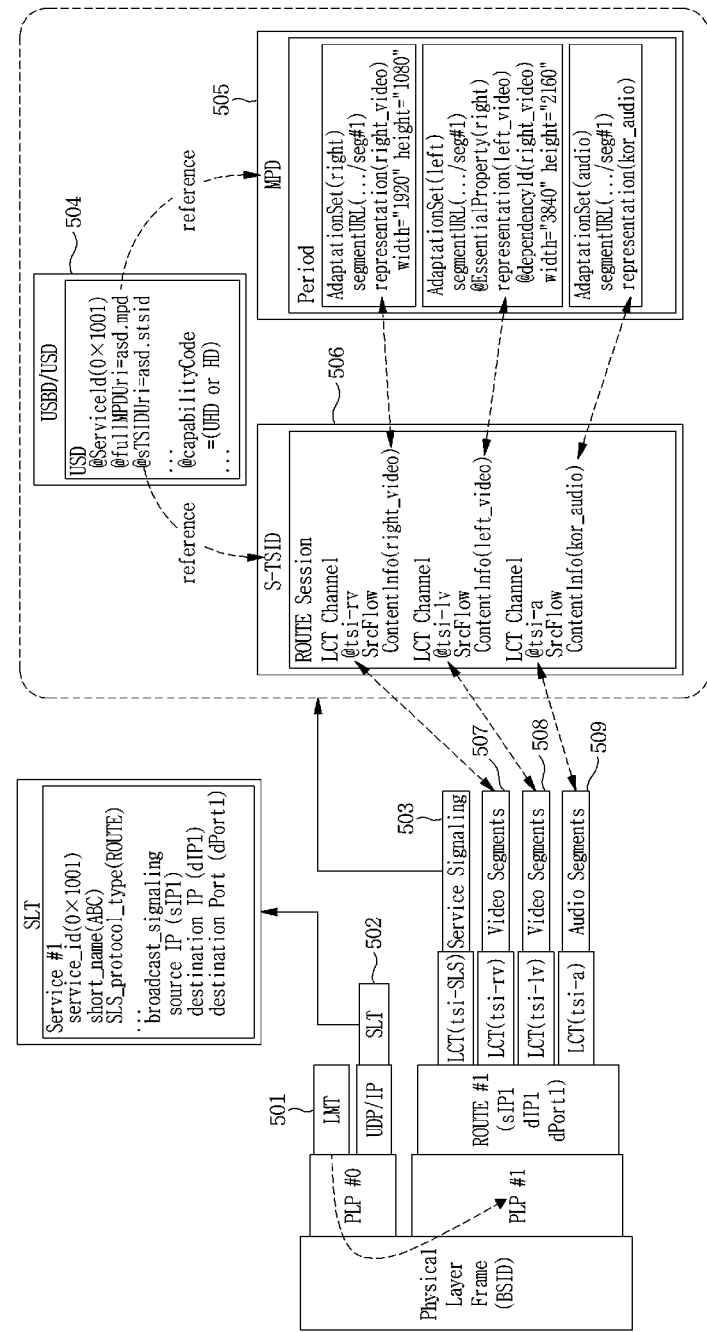
FIG. 5 is a view showing an embodiment of a hybrid 3DTV transmission and reception matching signaling structure using a scalable video codec based on ATSC 3.0 ROUTE/DASH.

FIG. 5 is a view showing an embodiment of a hybrid 3DTV transmission and reception matching signaling structure using a scalable video codec based on ATSC 3.0 ROUTE/DASH.

In a case of the hybrid 3DTV service using the scalable video codec, additional video may be transmitted to a base layer/mobile channel, and data for composing additional video and standard video may be transmitted to an enhancement layer/fixed channel. Here, by using dependencyID, presence of a correlation between the base layer and the enhancement layer may be transmitted to the receiving end.

A user may receive and analyze a service list table (SLT) 502 and a link mapping table (LMT) 501 first. The SLT 502 may provide signaling information of a service that a user wants, namely, source IP, destination IP/Port, etc. for acquiring service layer signaling (SLS) 503. The LMT 501 may provide a list of multicasts transmitted by a physical layer pipe (PLP). The LMT 501 may specially describe a mapping between PLP ID described at the LMT 501 and IP address and/or port related to service described at the SLT 502.

The received SLS 503 may be composed of user service bundle description (USBD)/user service description (USD) 504, media presentation description (MPD) 505, and/or service-based transport session instance description (S-TSID) 506. Based on information included in the USBD/ USD 504, video/audio components for receiving the related service may be received with reference to the MPD 505 and the S-TSID 506.

The USBD/USD 504 may be the standard for receiving components composing the related service. That is, it is possible to sequentially refer to the MPD 505 in which information of media components provided by a service is described, and the S-TSID 506 describing which path each of components described in the MPD 505 is transmitted through.

The MPD 505 may indicate information of each of the media components. For 3D video composition of hybrid 3DTV, two video components corresponding to left/right sides of a stereoscopic image are required, and thus two Adaptation Sets, namely, "AdaptationSet(right)" corresponding to right video and "AdaptationSet(left)" corresponding to left video may be composed within the same period. In order to transmit that the standard video and the additional video are a mutual stereoscopic 3D pair for 3D video composition to the receiving end, Essential or Supplemental Property may be used within the Adaptation Set of the standard video.

The embodiment of FIG. 5 is an embodiment of using the left video as a standard video. In addition, hybrid 3DTV service based on scalable video encoding is considered in FIG. 5, and thus it is possible to compose a representation for defining a base layer as an additional video, and defining an enhancement layer as a standard video within respective Adaptation Sets. Here, by using dependencyId within the representation of the standard video, a correlation between the enhancement layer and the base layer may be transmitted to the receiving end.

The S-TSID 506 may describe which layered coding transport (LCT) session video and/or audio described at the MPD 505 is transmitted through. Referring to FIG. 5, it is indicated that right_video described at the MPD 505 is transmitted through an LCT session 507 having tsi-ry as an ID value. Likewise, it is indicated that left_video described at the MPD 505 is transmitted through an LCT session 508 having tsi-lv as an ID value. In addition, it is indicated that audio described at the MPD 505 is transmitted through an LCT session 509 having tsi-a as an ID value.

Figure 6:
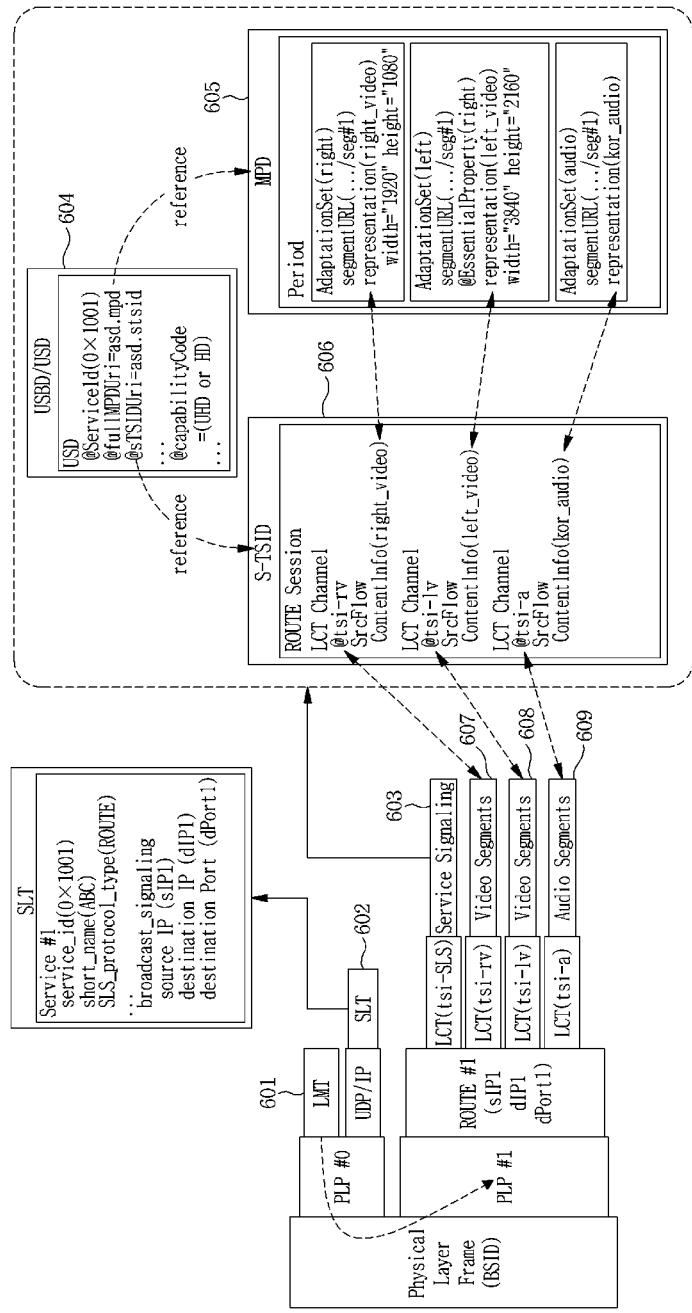
FIG. 6 is a view showing an embodiment of a hybrid 3DTV transmission and reception matching signaling structure using a simulcast 3D method based on ATSC 3.0 ROUTE/DASH.

FIG. 6 is a view showing an embodiment of a hybrid 3DTV transmission and reception matching signaling structure using a simulcast 3D method based on ATSC 3.0 ROUTE/DASH.

In a case of the hybrid 3DTV service using the simulcast 3D method, the additional video may be transmitted to the mobile channel, and the standard video may be transmitted to the fixed channel. Here, the standard video and the additional video are individually encoded, and thus there is no correlation therebetween, and it is unnecessary to transmit dependencyID to the receiving end.

A user may receive and analyze a service list table (SLT) 602 and a link mapping table (LMT) 601 first. The SLT 602 may provide signaling information of a service that a user wants, namely, source IP, destination IP/port, etc. for acquiring service layer signaling (SLS) 603. The LMT 601 may provide a list of multicasts transmitted to a physical layer pipe (PLP). The LMT 601 may specially describe a mapping between PLP ID described at the LMT 601 and IP address and/or port related to service described at the SLT 602.

The received SLS 602 may be composed of user service bundle description (USBD)/user service description (USD) 604, media presentation description (MPD) 605, and/or service-based transport session instance description (S-TSID) 606. Based on information included in the USBD/ USD 604, video/audio components for receiving the related service may be received with reference to the MPD 605 and the S-TSID 606.

The USBD/USD 604 may be the standard for receiving components composing the related service. That is, it is possible to sequentially refer to the MPD 605 in which information of media components provided by a server is described, and the S-TSID 606 describing which path each of components described in the MPD 605 is transmitted through.

The MPD 605 may indicate information of each of the media components. For 3D video composition of hybrid 3DTV, two video components corresponding to left/right sides of a stereoscopic image are required, and thus two Adaptation Sets, namely, "AdaptationSet(right)" corresponding to right video and "AdaptationSet(left)" corresponding to left video may be composed within the same period. In order to transmit that the standard video and the additional video are a mutual stereoscopic 3D pair for 3D video composition to the receiving end, Essential (or Supplemental) Property may be used within the Adaptation Set of the standard video.

The embodiment of FIG. 6 is an embodiment of using the left video as a standard video. In addition, hybrid 3DTV service based on the simulcast 3D method is considered in FIG. 6, and thus it is possible to compose a representation for defining a standard video for fixed broadcasting, and defining an additional video for mobile broadcasting within respective Adaptation Sets. The standard video and the additional video are respectively encoded by an individual video codec (for example, HEVC) for fixed/mobile broadcasting, and thus different from the method based on scalable video encoding, there may be no dependency between the standard video and the additional video. Therefore, it is unnecessary to define dependencyId within the representation of the standard video.

The S-TSID 606 may describe which layered coding transport (LCT) session video and/or audio described at the MPD 605 is transmitted through. Referring to FIG. 6, it is indicated that right_video described at the MPD 605 is transmitted through an LCT session 607 having tsi-ry as an ID value. Likewise, it is indicated that left_video described at the MPD 605 is transmitted through an LCT session 608 having tsi-lv as an ID value. In addition, it is indicated that audio described at the MPD 605 is transmitted through an LCT session 609 having tsi-a as an ID value.

Figure 7:
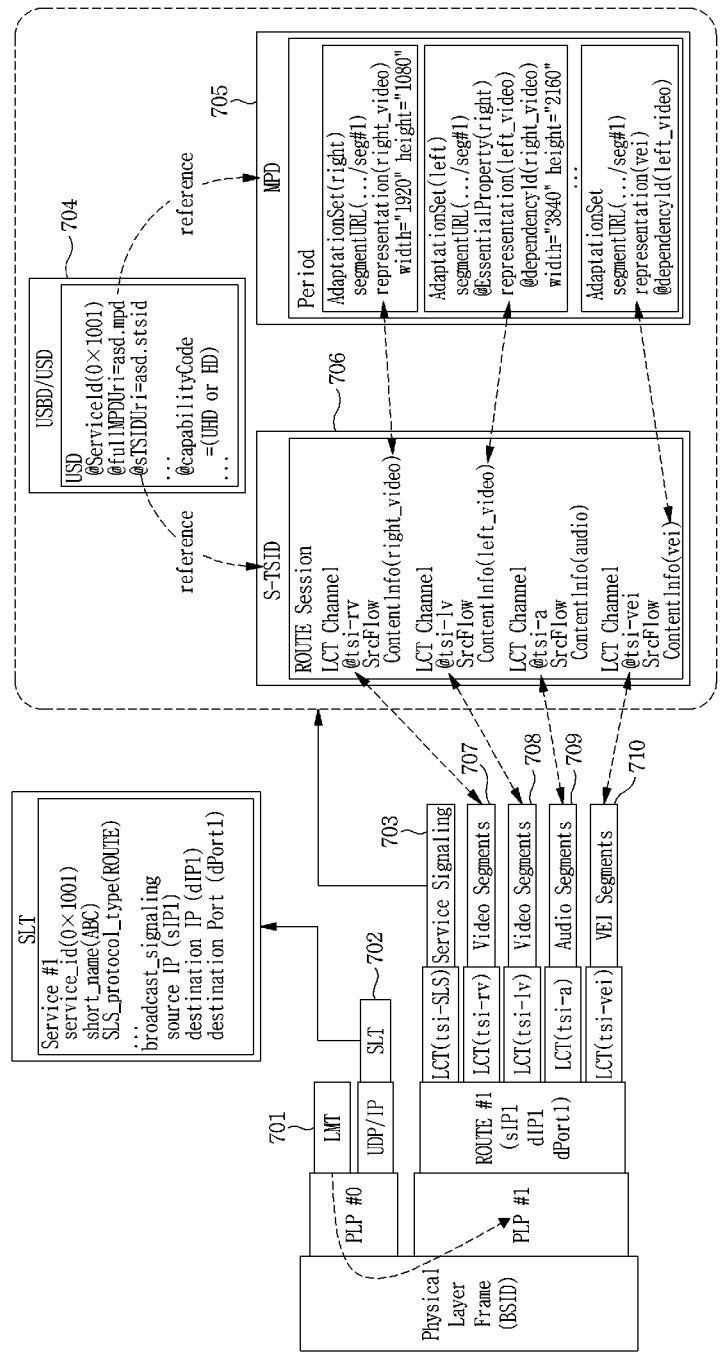
FIG. 7 is a view showing an embodiment of signaling VEI in a single PLP environment for video quality enhancement of hybrid 3DTV service using scalable video encoding based on ATSC 3.0 ROUTE/DASH.

FIG. 7 is a view showing an embodiment of signaling VEI for video quality enhancement of hybrid 3DTV service using scalable video encoding based on ATSC 3.0 ROUTE/ DASH.

Here, VEI information may be transmitted through a PLP that is the same as that of a video and/or audio component. That is, the embodiment of FIG. 7 relates to VEI signaling in a single PLP environment.

A user may receive and analyze a service list table (SLT) 702 and a link mapping table (LMT) 701 first. The SLT 702 may provide signaling information of a service that a user wants, namely, source IP, destination IP/Port, etc. for acquiring service layer signaling (SLS) 703. The LMT 701 may provide a list of multicasts transmitted to the physical layer pipe (PLP). The LMT 701 may specially describe a mapping between PLP ID described at the LMT 701 and IP address and/or port related to service described at the SLT 702.

The received SLS 703 may be composed of user service bundle description (USBD)/user service description (USD) 704, media presentation description (MPD) 705, and/or service-based transport session instance description (S-TSID) 706. Based on information included in the USBD/USD 704, video and/or audio components for receiving the related service may be received with reference to the MPD 705 and the S-TSID 706.

The USBD/USD 704 may be the standard for receiving components composing the related service. That is, it is possible to sequentially refer to the MPD 705 in which information of media components provided by a server is described, and the S-TSID 706 describing which path each of components described in the MPD 705 is transmitted through.

The MPD 705 may indicate information of each of the media components. For 3D video composition of hybrid 3DTV, two video components corresponding to left/right sides of a stereoscopic image are required, and thus two Adaptation Sets, namely, "AdaptationSet(right)" corresponding to right video and "AdaptationSet(left)" corresponding to left video may be composed within the same period. In order to transmit that the standard video and the additional video are a mutual stereoscopic 3D pair for 3D video composition to the receiving end, Essential (or Supplemental) Property may be used within the Adaptation Set of the standard video.

The embodiment of FIG. 7 is an embodiment of using the left video as a standard video. In addition, hybrid 3DTV service based on scalable video encoding is considered in FIG. 7, and thus it is possible to compose a representation for defining a base layer as the additional video, and defining an enhancement layer as the standard video within respective Adaptation Sets. Here, by using dependencyId within the representation of the standard video, the correlation between the enhancement layer and the base layer may be transmitted to the receiving end. In addition, for each period, a new Adaptation Set may be composed in addition to Adaptation Set composing video and/or audio components. For example, VEI for video quality enhancement of hybrid 3DTV service is defined and dependencyId is set to the standard video, whereby when the enhancement layer is composed with the base layer in 3D, VEI information for video quality enhancement may be also transmitted to the receiving end.

The S-TSID 706 may describe which layered coding transport (LCT) session video and/or audio described at the MPD 705 is transmitted through. Referring to FIG. 7, it is indicated that vei described at the MPD 705 is transmitted through an LCT session 710 having tsi-vei as an ID value. It is indicated that right_video, left_video which are described at the MPD 705, and audio which is not shown, are respectively transmitted through LCT sessions 707 to 709 having tsi-rv, tsi_lv, and tsi_a as ID values.

Figure 8:
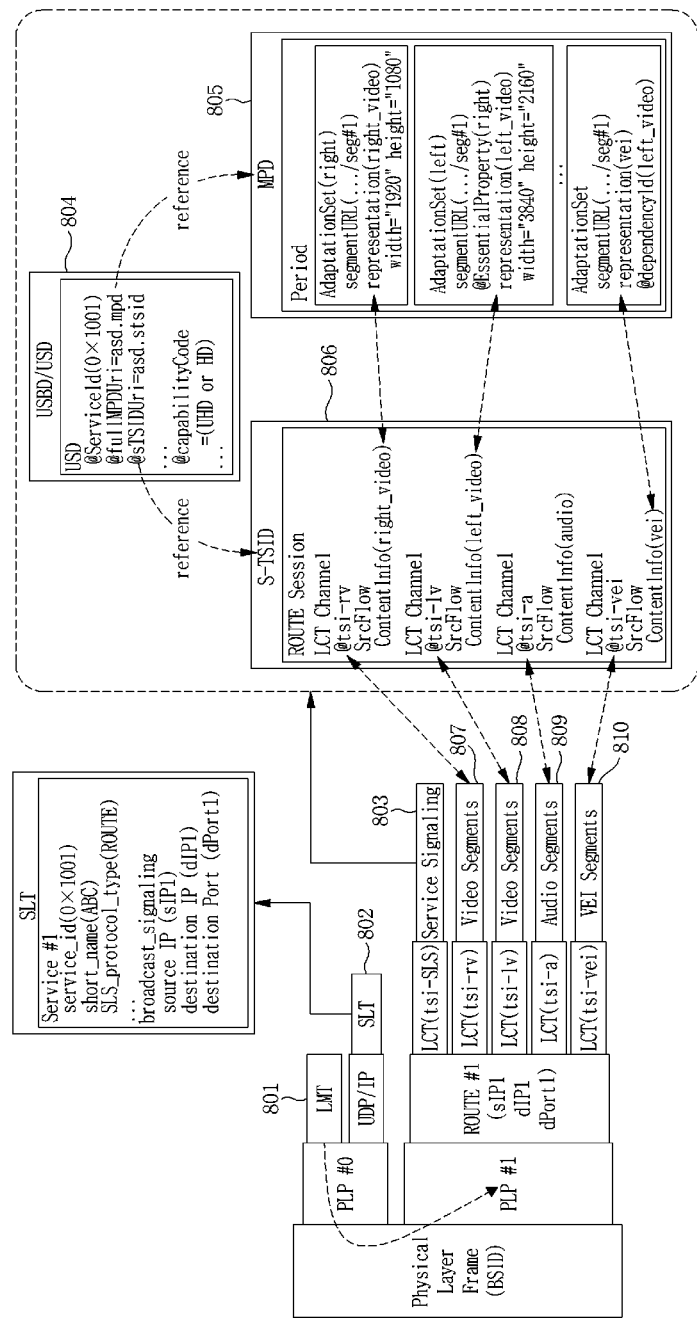
FIG. 8 is a view showing an embodiment of signaling VEI in a single PLP environment for video quality enhancement of hybrid 3DTV service using a simulcast 3D method based on ATSC 3.0 ROUTE/DASH.

FIG. 8 is a view showing an embodiment of signaling VEI for video quality enhancement of hybrid 3DTV service using a simulcast 3D method based on ATSC 3.0 ROUTE/DASH.

Here, VEI information may be transmitted through a PLP that is the same as that of a video and/or audio component. That is, the embodiment of FIG. 8 relates to VEI signaling in a single PLP environment.

A user may receive and analyze a service list table (SLT) 802 and a link mapping table (LMT) 801 first. The SLT 802 may provide signaling information of a service that a user wants, namely, source IP, destination IP/Port, etc. for acquiring service layer signaling (SLS) 803. The LMT 801 may provide a list of multicasts transmitted to the physical layer pipe (PLP). The LMT 801 may specially describe a mapping between PLP ID described at the LMT 801 and IP address and/or port related to service described at the SLT 802.

The received SLS 803 may be composed of user service bundle description (USBD)/user service description (USD) 804, media presentation description (MPD) 805, and/or service-based transport session instance description (S-TSID) 806. Based on the USBD/USD 804, video and/or audio components for receiving the related service may be received with reference to the MPD 805 and the S-TSID 806.

The USBD/USD 804 may be the standard for receiving components composing the related service. That is, it is possible to sequentially refer to the MPD 805 in which information of media components provided by a server is described, and the S-TSID 806 describing which path each of components described in the MPD 805 is transmitted through.

The MPD 805 may indicate information of each of the media components. For 3D video composition of hybrid 3DTV, two video components corresponding to left/right sides of a stereoscopic image are required, and thus two Adaptation Sets, namely, "AdaptationSet(right)" corresponding to right video and "AdaptationSet(left)" corresponding to left video may be composed within the same period. In order to transmit that the standard video and the additional video are a mutual stereoscopic 3D pair for 3D video composition to the receiving end, Essential (or Supplemental) Property may be used within the Adaptation Set of the standard video.

The embodiment of FIG. 8 is an embodiment of using the left video as a standard video. In addition, hybrid 3DTV service based on a simulcast 3D method is considered in FIG. 8, and thus it is possible to compose a representation for defining a standard video for fixed broadcasting and defining an additional video for mobile broadcasting within respective Adaptation Sets. The standard video and the additional video are respectively encoded by an individual video codec (for example, HEVC) for fixed/mobile broadcasting, and are thus different from the method based on scalable video encoding. Accordingly, there is no dependency between the standard video and the additional video. Therefore, it is unnecessary to define dependencyId within the representation of the standard video.

In addition, for each period, a new Adaptation Set may be composed in addition to Adaptation Set composing video and/or audio components. For example, VEI for video quality enhancement of hybrid 3DTV service is defined and dependencyId is set as the standard video, whereby when the standard video for fixed broadcasting is composed with the additional video for mobile broadcasting in 3D, VEI information for video quality enhancement may be also transmitted to the receiving end.

The S-TSID 806 may describe which layered coding transport (LCT) session video and/or audios described at the MPD 805 are transmitted through. Referring to FIG. 8, it is indicated that right_video described at the MPD 805 is transmitted through an LCT session 807 having tsi-ry as an ID value. It is indicated that left_video described at the MPD 805, audio and vei which are not shown, are respectively transmitted through LCT sessions 808 to 810 having tsi_lv, tsi_a, and tsi_vei as ID values.

Figure 9:
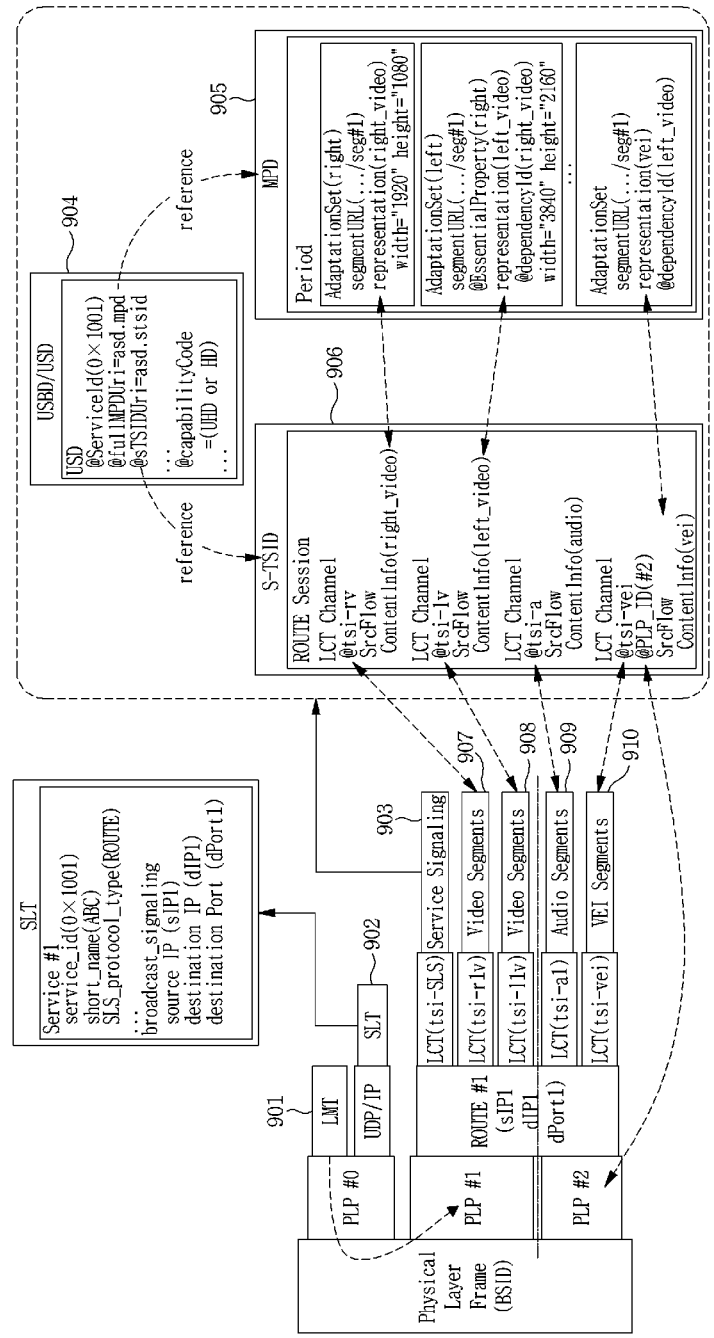
FIG. 9 is a view showing an embodiment of signaling VEI in a multiple PLP environment for video quality enhancement of hybrid 3DTV service using scalable video encoding based on ATSC 3.0 ROUTE/DASH.

FIG. 9 is a view showing an embodiment of signaling VEI for video quality enhancement of hybrid 3DTV service using scalable video encoding based on ATSC 3.0 ROUTE/DASH.

Here, VEI information may be transmitted through a PLP that is different from that of a video and/or audio component.

That is, the embodiment of FIG. 9 relates to VEI signaling in a multiple PLP environment.

A user may receive and analyze a service list table (SLT) 902 and a link mapping table (LMT) 901 first. The SLT 902 may provide signaling information of a service that a user wants, namely, source IP, destination IP/Port, etc. for acquiring service layer signaling (SLS) 903. The LMT 901 may provide a list of multicasts transmitted to the physical layer pipe (PLP). The LMT 901 may specially describe a mapping between PLP ID described at the LMT 901 and IP address and/or port related to service described at the SLT 902.

The received SLS 903 may be composed of user service bundle description (USBD)/user service description (USD) 904, media presentation description (MPD) 905, and/or service-based transport session instance description (S-TSID) 906. Based on information included in the USBD/USD 904, video and/or audio components for receiving the related service may be received with reference to the MPD 705 and the S-TSID 906.

The USBD/USD 904 may be the standard for receiving components composing the related service. That is, it is possible to sequentially refer to the MPD 905 in which information of media components provided by a server is described, and the S-TSID 906 describing which path each of components described in the MPD 905 is transmitted through.

The MPD 905 may indicate information of each of the media components. For 3D video composition of hybrid 3DTV, two video components corresponding to left/right sides of a stereoscopic image are required, and thus two Adaptation Sets, namely, "AdaptationSet(right)" corresponding to right video and "AdaptationSet(left)" corresponding to left video may be composed within the same period. In order to transmit that the standard video and the additional video are a mutual stereoscopic 3D pair for 3D video composition to the receiving end, Essential (or Supplemental) Property may be used within the Adaptation Set of the standard video.

The embodiment of FIG. 9 is an embodiment of using the left video as a standard video. In addition, hybrid 3DTV service based on scalable video encoding is considered in FIG. 9, and thus it is possible to compose a representation for defining a base layer as an additional video, and defining an enhancement layer as a standard video within respective Adaptation Sets. Here, by using dependencyId within the representation of the standard video, a correlation between the enhancement layer and the base layer may be transmitted to the receiving end. In addition, for each period, a new Adaptation Set may be composed in addition to Adaptation Set composing video and/or audio components. For example, VEI for video quality enhancement of hybrid 3DTV service is defined and dependencyId is set as the standard video, whereby when the enhancement layer is composed with the base layer in 3D, VEI information for video quality enhancement may be also transmitted to the receiving end.

Overall S-TSID signaling is the same as the case of the single PLP shown in FIG. 7. However, the LMT 901 describes only a mapping between PLP #1 described in the LMT 901 and information for acquiring SLS 903 described in the SLT 902, namely, IP address/port of the SLS 903. Therefore, in the multiple PLP environment of FIG. 9, when VEI information is transmitted through PLP #2 through which SLS is not transmitted, the S-TSID 906 not the LMT 901 may indicate that the LCT session 910 having tsi-vei as an ID value is transmitted through the PLP_ID #2.

As described above, right_video, left_video that are described at the MPD 905 and audio which is not shown, may be respectively transmitted through LCT sessions 907 to 909 having tsi-rlv, tsi-llv, and tsi-al as ID values.

Figure 10:
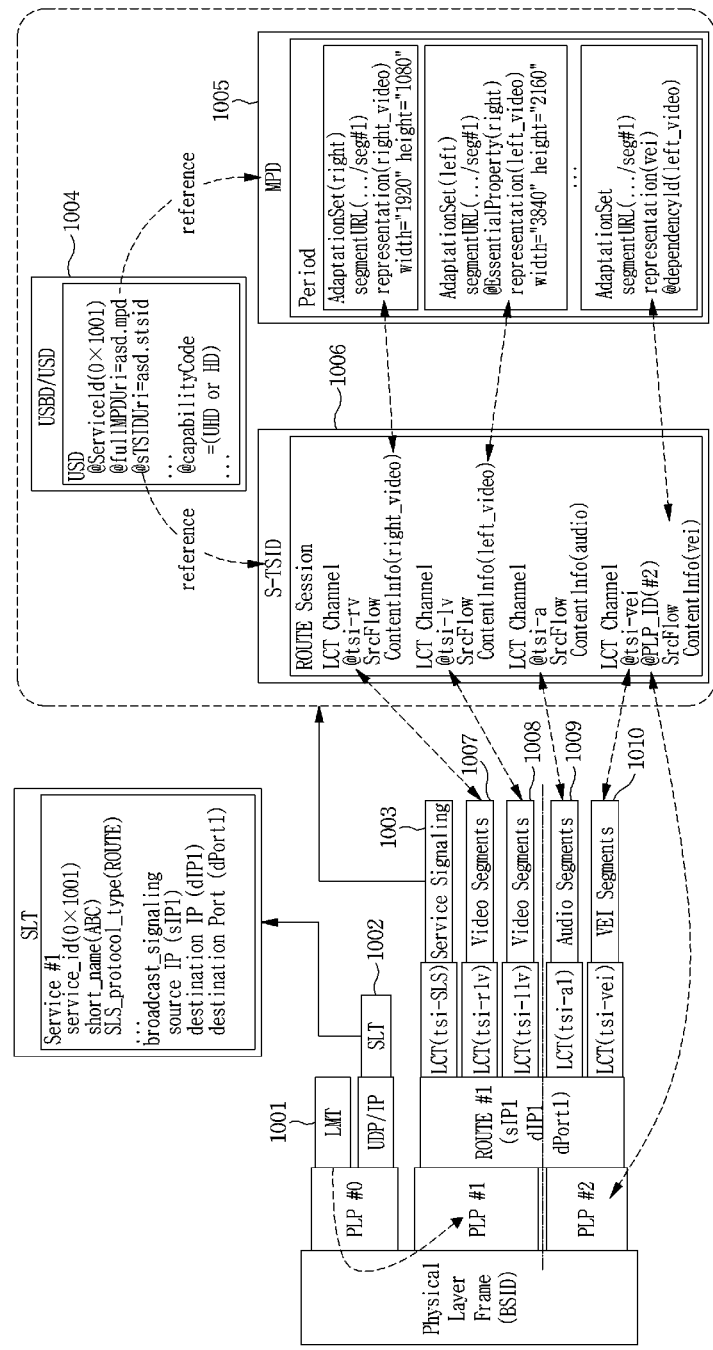
FIG. 10 is a view showing an embodiment of signaling VEI in a multiple PLP environment for video quality enhancement of hybrid 3DTV service using a simulcast 3D method based on ATSC 3.0 ROUTE/DASH.

FIG. 10 is a view showing an embodiment of signaling VEI for video quality enhancement of hybrid 3DTV service using a simulcast 3D method based on ATSC 3.0 ROUTE/DASH.

Here, VEI information may be transmitted through a PLP that is different from that of a video and/or audio component. That is, the embodiment of FIG. 10 relates to VEI signaling in a multiple PLP environment.

A user may receive and analyze a service list table (SLT) 1002 and a link mapping table (LMT) 1001 first. The SLT 1002 may provide signaling information of a service that a user wants, namely, source IP, destination IP/Port, etc. for acquiring service layer signaling (SLS) 1003. The LMT 1001 may provide a list of multicasts transmitted to the physical layer pipe (PLP). The LMT 1001 may specially describe a mapping between PLP ID described at the LMT 1001 and IP address and/or port related to service described at the SLT 1002.

The received SLS 1003 may be composed of user service bundle description (USBD)/user service description (USD) 1004, media presentation description (MPD) 1005, and/or service-based transport session instance description (S-TSID) 1006. Based on the USBD/USD 1004, video and/or audio components for receiving the related service may be received with reference to the MPD 1005 and the S-TSID 1006.

The USBD/USD 1004 may be the standard for receiving components composing the related service. That is, it is possible to sequentially refer to the MPD 1005 in which information of media components provided by a server is described, and the S-TSID 1006 describing which path each of components described in the MPD 1005 is transmitted through.

The MPD 1005 may indicate information of each of the media components. For 3D video composition of hybrid 3DTV, two video components corresponding to left/right sides of a stereoscopic image are required, and thus two Adaptation Sets, namely, "AdaptationSet(right)" corresponding to right video and "AdaptationSet(left)" corresponding to left video may be composed within the same period. In order to transmit that the standard video and the additional video are a mutual stereoscopic 3D pair for 3D video composition to the receiving end, Essential (or Supplemental) Property may be used within the Adaptation Set of the standard video.

The embodiment of FIG. 10 is an embodiment of using the left video as a standard video. In addition, hybrid 3DTV service based on a simulcast 3D method is considered in FIG. 10, and thus it is possible to compose a representation for defining a standard video for fixed broadcasting, and defining an additional video for mobile broadcasting within respective Adaptation Sets. The standard video and the additional video are respectively encoded by an individual video codec (for example, HEVC) for fixed/mobile broadcasting, and thus different from the method based on scalable video encoding, there may be no dependency between the standard video and the additional video. Therefore, it is unnecessary to define dependencyId within the representation of the standard video.

In addition, for each period, a new Adaptation Set may be composed in addition to Adaptation Set composing video and/or audio components. For example, VEI for video quality enhancement of hybrid 3DTV service is defined and dependencyId is set as the standard video, whereby when the standard video for fixed broadcasting is composed with the additional video for mobile broadcasting in 3D, VEI information for video quality enhancement may be also transmitted to the receiving end.

Overall S-TSID signaling is the same as the case of the single PLP shown in FIG. 8. However, the LMT 1001 describes only a mapping between PLP #1 described in the LMT 1001 and information for acquiring SLS 1003 described in the SLT 1002, namely, IP address/port of the SLS 1003. Therefore, in the multiple PLP environment of FIG. 10, when VEI information is transmitted through PLP #2 through which the SLS 1003 is not transmitted, the S-TSID 1006 not the LMT 1001 may indicate that the LCT session 1010 having tsi-vei as an ID value is transmitted through the PLP_ID #2.

As described above, right_video, left_video that are described at the MPD 1005 and audio which is not shown may be respectively transmitted through LCT sessions 1007 to 1009 having tsi-rlv, tsi-llv, and tsi-al as ID values.

Figure 11:
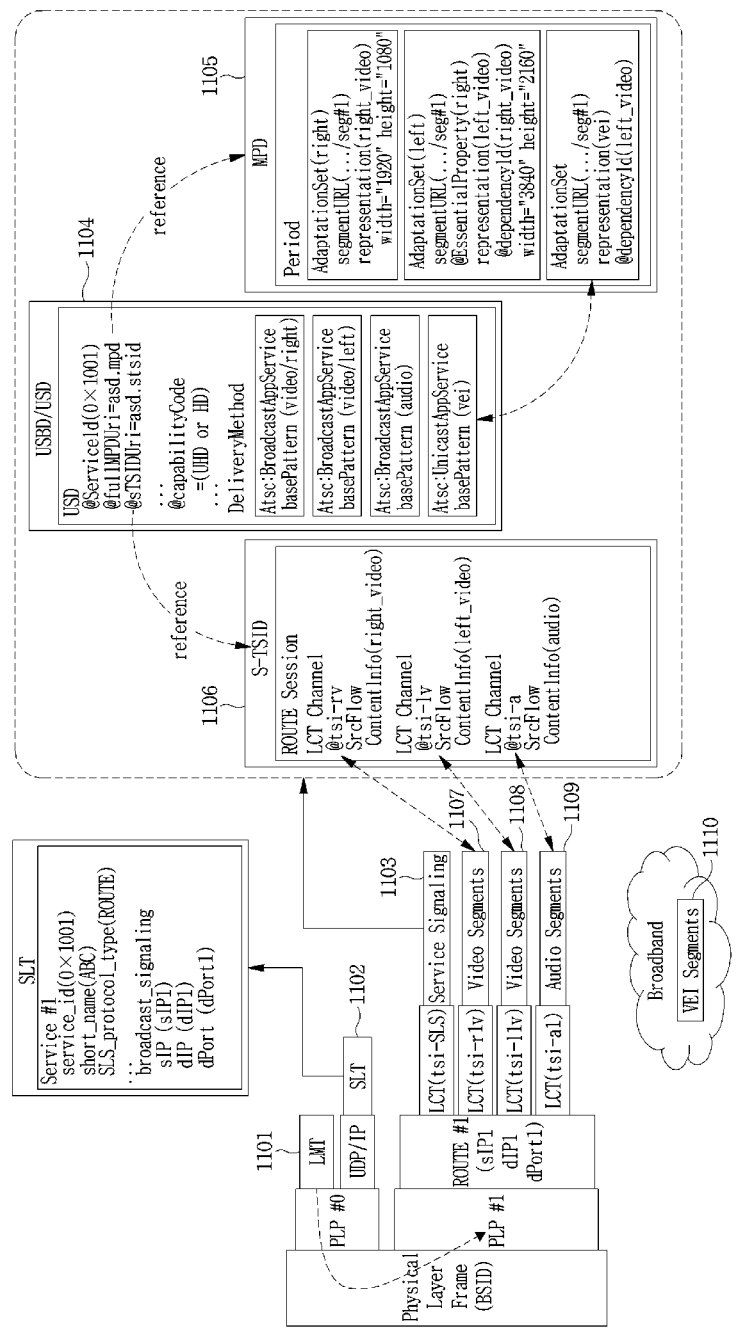
FIG. 11 is a view showing an embodiment of signaling VEI in a broadband environment for video quality enhancement of hybrid 3DTV service using scalable video encoding based on ATSC 3.0 ROUTE/DASH.

FIG. 11 is a view showing an embodiment of signaling VEI for video quality enhancement of hybrid 3DTV service using scalable video encoding based on ATSC 3.0 ROUTE/DASH.

Here, VEI information may be transmitted through a broadband network. That is, the embodiment of FIG. 11 relates to VEI signaling in a broadband environment.

A user may receive and analyze a service list table (SLT) 1102 and a link mapping table (LMT) 1101 first. The SLT 1102 may provide signaling information of a service that a user wants, namely, source IP, destination IP/Port, etc. for acquiring service layer signaling (SLS) 1103. The LMT 1101 may provide a list of multicasts transmitted to the physical layer pipe (PLP). The LMT 1101 may specially describe a mapping between PLP ID described at the LMT 1101 and IP address and/or port related to service described at the SLT 1102.

The received SLS 1103 may be composed of user service bundle description (USBD)/user service description (USD) 1104, media presentation description (MPD) 1105, and/or service-based transport session instance description (S-TSID) 1106. Based on information included in the USBD/USD 1104, video and/or audio components for receiving the related service may be received with reference to the MPD 1105 and the S-TSID 1106.

The USBD/USD 1104 may be the standard for receiving components composing the related service. That is, it is possible to sequentially refer to the MPD 1105 in which information of media components provided by a server is described, and the S-TSID 1106 describing which path each of components described in the MPD 1105 is transmitted through.

In addition, when data is transmitted through a broadband network other than a broadcasting network, the USBD/USD 1104 may transmit DeliveryMethod for distinguishing this, to the receiving end. In the embodiment shown in FIG. 11, VEI 1110 is transmitted through a broadband network, and thus the USBD/USD 1104 may indicate basePattern of the VEI 1110 as ATSC:UnicastAppService.

Signaling of the MPD 1105 may be the same as the embodiment using scalable video encoding shown in FIG. 5. However, Representation ID of the VEI 1110 is desired to be the same as basePattern ID described at the USBD/USD 1104.

The S-TSID 1106 indicates only which components are transmitted through which LCT session (1107 to 1109), and thus signaling for the VEI 1110 transmitted through the broadband may not be performed at the S-TSID 1106.

Figure 12:
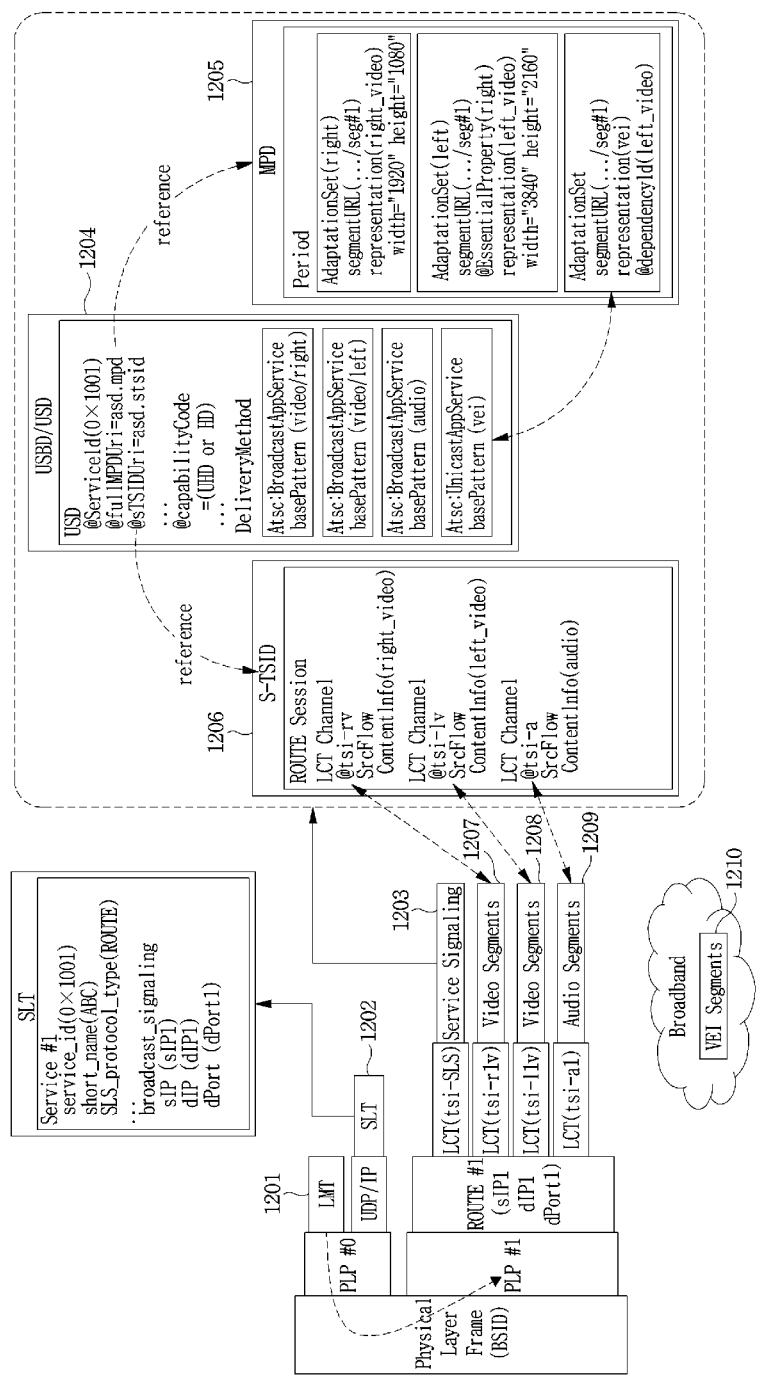
FIG. 12 is a view showing an embodiment of signaling VEI in a broadband environment for video quality enhancement of hybrid 3DTV service using a simulcast 3D method based on ATSC 3.0 ROUTE/DASH.

FIG. 12 is a view showing an embodiment of signaling VEI for video quality enhancement of hybrid 3DTV service using a simulcast 3D method based on ATSC 3.0 ROUTE/DASH.

Here, VEI information may be transmitted through a broadband network. That is, the embodiment of FIG. 12 relates to VEI signaling in a broadband environment.

A user may receive and analyze a service list table (SLT) 1202 and a link mapping table (LMT) 1201 first. The SLT 1202 may provide signaling information of a service that a user wants, namely, source IP, destination IP/Port, etc. for acquiring service layer signaling (SLS) 1203. The LMT 1201 may provide a list of multicasts transmitted to the physical layer pipe (PLP). The LMT 1201 may specially describe a mapping between PLP ID described at the LMT 1201 and IP address and/or port related to service described at the SLT 1202.

The received SLS 1203 may be composed of user service bundle description (USBD)/user service description (USD) 1204, media presentation description (MPD) 1205, and/or service-based transport session instance description (S-TSID) 1206. Based on the USBD/USD 1204, video and/or audio components for receiving the related service may be received with reference to the MPD 1205 and the S-TSID 1206.

The USBD/USD 1204 may be the standard for receiving components composing the related service. That is, it is possible to sequentially refer to the MPD 1205 in which information of media components provided by a server is described, and the S-TSID 1206 describing which path each of components described in the MPD 1205 is transmitted through.

In addition, when data is transmitted through a broadband network other than a broadcasting network, the USBD/USD 1204 may transmit DeliveryMethod for distinguishing this, to the receiving end. In the embodiment shown in FIG. 12, VEI 1210 is transmitted through a broadband network, and thus the USBD/USD 1204 may indicate basePattern of the VEI 1210 as ATSC:UnicastAppService.

Signaling of the MPD 1205 may be the same as the embodiment using scalable video encoding shown in FIG. 6. However, Representation ID of the VEI 1210 is desired to be the same as basePattern ID described at the USBD/USD 1204.

The S-TSID 1206 indicates only which components are transmitted through which LCT session (1207 to 1209), and thus signaling for the VEI 1210 transmitted through the broadband may not be performed at the S-TSID 1206.

Although the exemplary methods explained in the present disclosure are represented as a series of operations for clarity, the order of performing the steps may be non-limited by the methods. If necessary, each of the steps can be performed at the same time or can be performed by an order different from each other. In order to implement the method according to the present disclosure, other steps may be included to the illustrated step, or some steps may be excluded by including the remaining steps, or some steps may be excluded by including additional other steps.

The various embodiments of the present disclosure have not illustrated all possible combinations, but describe the representative aspects of the present disclosure, and the various embodiments can be independently applied or two or more thereof can be simultaneously applied.

In addition, various embodiments of the present disclosure may be implemented using hardware, firmware, software, or any combinations thereof. In case of the implementation by hardware, the embodiments of the present disclosure may be implemented by at least one selected from the group consisting of application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors and the like.

The scope of the present disclosure includes software or machine-executable commands (for example, an operating system, an application, firmware, a program, etc.) that enables operations according to the methods of the various embodiments to execute at an apparatus or a computer, and a non-transitory computer-readable medium, in which such software or command, etc. is stored, executable at an apparatus or a computer.

In the various embodiments of the present disclosure, although VEI signaling for video quality enhancement of hybrid 3DTV service based on ATSC 3.0 ROUTE/DASH has been described, the scope of the present disclosure is not limited thereto. For example, other than hybrid 3DTV service based on ATSC 3.0 ROUTE/DASH, the present disclosure may be applied to broadcasting service of various methods require signaling of additional data.

In the various embodiments of the present disclosure, although a case where additional data is VEI for video quality enhancement has been described, the scope of the present disclosure is not limited thereto, and the present disclosure may be applied to signaling of additional data other than the VEI for video quality enhancement.

In the various embodiments of the present disclosure, although the case where the broadcasting service uses a simulcast 3D method or scalable video encoding has been described, the scope of the present disclosure is not limited thereto, and the present disclosure may be applied to the case of using a different method of video encoding.

What is claimed is:

1. An IP-based hybrid 3DTV content reception apparatus, comprising:
    a receiving unit configured to receive multiplexed 3DTV content information;
    an additional data obtaining unit configured to obtain service layer signaling information from the received 3DTV content information, and obtain additional data based on the obtained service layer signaling information;
    a decoding unit configured to decode the received 3DTV content information by using the obtained additional data; and
    a playing back unit configured to play back the decoded 3DTV content,
    wherein the 3DTV content comprises either one or both of video data and audio data,
    wherein the additional data comprises data required for either one or both of decoding and playing back the 3DTV content,
    wherein the service layer signaling information comprises information about a standard for receiving media components (User Service Bundle Description (USBD)) and/or User Service Description (USD)) of the 3DTV content, information of the media components (Media Presentation Description (MPD), and information about a session through which the media components are transmitted (Service-based Transport Session Instance Description (S-TSID)), and
    wherein the MPD comprises information corresponding to right video and information corresponding left video within a same period, and
    wherein the media components are received with reference to the MPD and the S-TSID based on information included in the USBD and/or the USD.

2. The apparatus of claim 1, wherein the service layer signaling information further comprises information about a video or audio component of the 3DTV content, and information about the additional data which is related to the video or audio component for each unit period.

3. The apparatus of claim 1, wherein the service layer signaling information further comprises information about a session through which the additional data which is related to a video or audio component of the 3DTV content is transmitted.

4. The apparatus of claim 1, wherein the additional data further comprises video enhancement information (VEI) for enhancing quality of a video.

5. The apparatus of claim 4, wherein the service layer signaling information further comprises information about dependency of the VEI.

6. The apparatus of claim 1, wherein the additional data is received through a physical layer pipe (PLP) that is same as that of a video or audio component of the 3DTV content.

7. The apparatus of claim 1, wherein the additional data is received through a physical layer pipe that is different from that of a video or audio component of the 3DTV content, and the service layer signaling information further comprises information for identifying the physical layer pipe through which the additional data is received.

8. The apparatus of claim 1, wherein the additional data is received separately from the 3DTV content, and the service layer signaling information further comprises information about the obtaining of the additional data.

9. The apparatus of claim 1, wherein
    the information corresponding to the right video is AdaptationSet(right) corresponding to the right video and the information corresponding to the left video is AdaptationSet(left) corresponding to the left video,
    Adaptation Set of standard video comprises Essential or Supplemental Property, and
    the standard video is either one of the right video and the left video.

10. An IP-based hybrid 3DTV content reception method, comprising:
    receiving multiplexed 3DTV content information;
    obtaining service layer signaling information from the received 3DTV content information;
    obtaining additional data based on the obtained service layer signaling information;
    decoding the 3DTV content information by using the obtained additional data; and
    playing back the decoded 3DTV content,
    wherein the 3DTV content comprises either one or both of video data and audio data,
    wherein the additional data comprises data required for either one or both of decoding and playing back the 3DTV content,
    wherein the service layer signaling information comprises information about a standard for receiving media components (User Service Bundle Description (USBD)) and/or User Service Description (USD)) of the 3DTV content, information of the media components (Media Presentation Description (MPD), and information about a session through which the media components are transmitted (Service-based Transport Session Instance Description (S-TSID)), and wherein the MPD comprises information corresponding to right video and information corresponding left video within a same period, and wherein the media components are received with reference to the MPD and the S-TSID based on information included in the USBD and/or the USD.

11. The method of claim 10, wherein the information corresponding to the right video is AdaptationSet(right) corresponding to the right video and the information corresponding to the left video is AdaptationSet(left) corresponding to the left video, Adaptation Set of standard video comprises Essential or Supplemental Property, and the standard video is either one of the right video and the left video.

12. An IP-based hybrid 3DTV content transmission apparatus, comprising:

an input unit configured to receive 3DTV content;

an encoding unit configured to encode the received 3DTV content;

an additional data generating unit configured to generate additional data;

a service layer signaling information generating unit configured to generate service layer signaling information for obtaining the generated additional data;

a multiplexing unit configured to generate 3DTV content information by multiplexing the encoded 3DTV content and the service layer signaling information; and a transmitting unit configured to transmit the multiplexed 3DTV content information, wherein the 3DTV content comprises either one or both of video data and audio data, wherein the additional data comprises data required for either one or both of decoding and playing back the 3DTV content, wherein the service layer signaling information comprises information about a standard for receiving media components (User Service Bundle Description (USBD)) and/or User Service Description (USD)) of the 3DTV content, information of the media components (Media Presentation Description (MPD), and information about a session through which the media components are transmitted (Service-based Transport Session Instance Description (S-TSID)), and wherein the MPD comprises information corresponding to right video and information corresponding left video within a same period, and wherein the media components are received with reference to the MPD and the S-TSID based on information included in the USBD and/or the USD.

13. The apparatus of claim 12, wherein the service layer signaling information further comprises information about a video or audio component of the 3DTV content, and information about the additional data which is related to the video or audio component for each unit period.

14. The apparatus of claim 12, wherein the service layer signaling information further comprises information about a session through which the additional data which is related to a video or audio component of the 3DTV content is transmitted.

15. The apparatus of claim 12, wherein the additional data comprises video enhancement information (VEI) for enhancing quality of a video.

16. The apparatus of claim 15, wherein the service layer signaling information further comprises information about dependency of the VEI.

17. The apparatus of claim 12, wherein the additional data is transmitted through a physical layer pipe (PLP) that is same as that of a video or audio component of the 3DTV content.

18. The apparatus of claim 12, wherein the additional data is transmitted through a physical layer pipe that is different from that of a video or audio component of the 3DTV content, and the service layer signaling information further comprises information for identifying the physical layer pipe through which the additional data is transmitted.

19. The apparatus of claim 12, wherein the additional data is transmitted separately from the 3DTV content, and the service layer signaling information further comprises information about the obtaining of the additional data.

20. The apparatus of claim 12, wherein the information corresponding to the right video is AdaptationSet(right) corresponding to the right video and the information corresponding to the left video is AdaptationSet(left) corresponding to the left video, wherein Adaptation Set of standard video comprises Essential or Supplemental Property, and the standard video is either one of the right video and the left video.

* * * * *